United States Patent [19]
Bouwhuis

[11] 3,876,842
[45] Apr. 8, 1975

[54] APPARATUS FOR READING A FLAT RECORD CARRIER

[75] Inventor: Gijsbertus Bouwhuis, Eindhoven, Netherlands

[73] Assignee: U.S. Philips Corporation, New York, N.Y.

[22] Filed: Mar. 28, 1973

[21] Appl. No.: 345,644

[30] Foreign Application Priority Data

May 11, 1972 Netherlands ........................ 7206378

[52] U.S. Cl.179/100.41 L; 178/DIG. 29; 178/6.7 A; 179/100.3 D; 179/100.3 V; 179/100.3 G; 179/100.4 D

[51] Int. Cl. ......................... G11b 21/10; H04n 5/76

[58] Field of Search179/100.3 V, 100.3 R, 100.3 D, 179/100.3 G, 100.41 L, 100.4 D; 178/6.7 R, 6.7 A, DIG. 29, 7.1, 7.6; 250/201, 202, 203 R, 219 Q, 219 QA, 219 FT, 219 D, 219 DD, 219 FR; 340/173 LM; 356/167; 352/26, 103

[56] References Cited

UNITED STATES PATENTS 3,155,452 11/1964 Plankeel ......................... 250/202 X
3,198,880 8/1965 Toulon ......................... 179/100.3 V
3,452,163 6/1969 Dahlen ......................... 179/100.41 L
3,530,258 9/1970 Gregg et al. ..................... 178/6.7 A
3,673,412 6/1972 Olson ........................... 179/100.3 V
3,743,395 7/1973 Preuss .......................... 178/DIG. 29

*Primary Examiner*—Raymond F. Cardillo, Jr.
*Attorney, Agent, or Firm*—Frank R. Trifari; Simon L. Cohen

[57] ABSTRACT

An apparatus for reading a flat record carrier on which information is recorded in at least one track which has an optical structure is described. By projecting onto the plane of the track part to be read three spots of radiation the dimensions of which correspond to the smallest detail in the optical structure and the positions of which, viewed in the direction of width of the track, are different, and by inserting a radiation-sensitive detector in each of the radiation beams emanating from the spots of radiation it is possible to ascertain whether a read beam is correctly directed on to the track to be read.

3 Claims, 5 Drawing Figures

APPARATUS FOR READING A FLAT RECORD CARRIER

Figure 1:
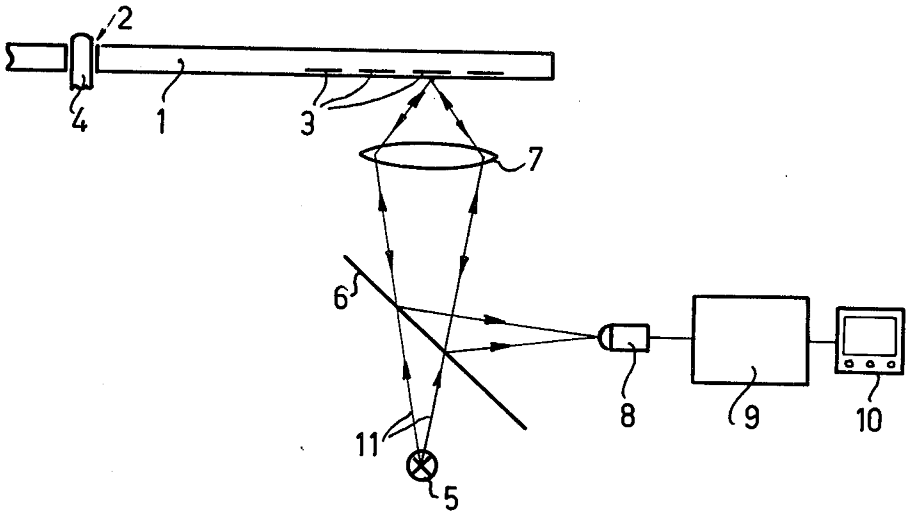
Fig. 1 PRIOR ART

The invention relates to an apparatus for reading a flat record carrier on which information, for example video and/or audio information, is recorded in at least one track which has an optical structure, which apparatus comprises a source of radiation and a radiation-sensitive detection system for converting the radiation emitted by the radiation source and modulated by the record carrier into electric signals.

Such an apparatus is described in the U.S. Pat. No. 3.530.258. When optically reading a disc-shaped record carrier it is rotated so that the read beam scans a track in a tangential direction.

In the known apparatus the spiral track is followed in that a casing which accommodates the radiation source and the detection system is displaced in a radial direction relative to the record carrier.

To ensure that the radiation-sensitive detector which converts the high-frequency information of the record carrier into an electric signal always receives only radiation from one track, the position on the record carrier of the light spot which is projected onto this detector must be continuously detected and adjusted.

For this purpose, in the known apparatus the record carrier is illuminated with a wide read beam, while two sub-beams derived from the beam transmitted through the record carrier are directed onto two radiation-sensitive detector by means of optical fibers. The sub-beams emanate from two radially different parts of the record carrier. A comparison of the magnitudes of the electric signals at the outputs of the detectors permits the detection of the position of the read beam relative to the track to be read.

It is an object of the present invention to provide an apparatus of the type described at the beginning of this specification in which the position of the read beam relative to the track is determined according to a principle different from that of the known apparatus. The apparatus according to the invention is characterized in that the source of radiation emits at least three beams of radiation for producing at least three spots of radiation in the plane of the track part to be read, the dimensions of these spots at least corresponding to the smallest detail in the optical structure while their positions, viewed in the direction of width of the track, are different, and in that for each beam of radiation at least one radiation-sensitive detector is provided. A comparison of the electric output signals from the detectors disposed in the radiation path of the two outer radiation beams provides a signal for ascertaining whether the inner radiation beam (the read beam) is correctly directed with respect to the track.

The apparatus according to the invention may be used to advantage for reading a reflecting record carrier.

The term "reflecting record carrier" is to be understood to mean a record carrier in which the information is recorded in a reflecting structure. This structure may consist of regions and intermediate areas which have different reflection coefficients and are coplanar. A reflecting structure may alternatively comprise regions and areas which have the same reflection coefficients and lie at different levels in the record carrier.

When according to a further feature at least one of the radiation beams which, viewed in the direction of width of the track, are the outer beams, the principal ray intersects the plane of the track part to be read at an acute angle, the position of this plane relative to the radiation-sensitive detection system can also be determined. In this determination the fact is utilized that the position at which the obliquely incident principal ray of a radiation beam intersects the plane of the track changes on displacement of the plane.

In an apparatus according to the invention the source of radiation preferably comprises a point radiation source and a grating disposed behind this source for projecting diffraction images of the point source onto the plane of the track, the lines of the grating projected onto the plane of a track part to be read being at an acute angle to the direction of the track.

Figure 2:
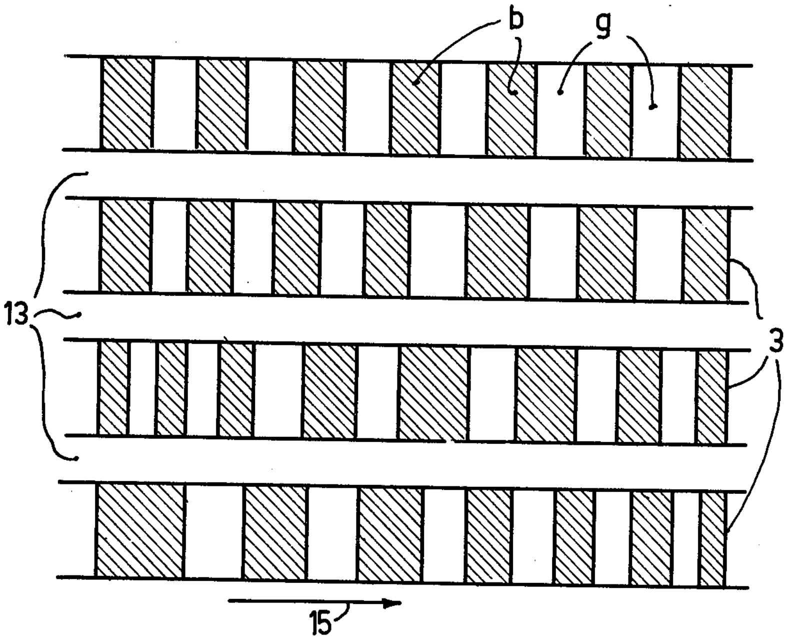
Fig. 2 PRIOR ART
Figure 3:
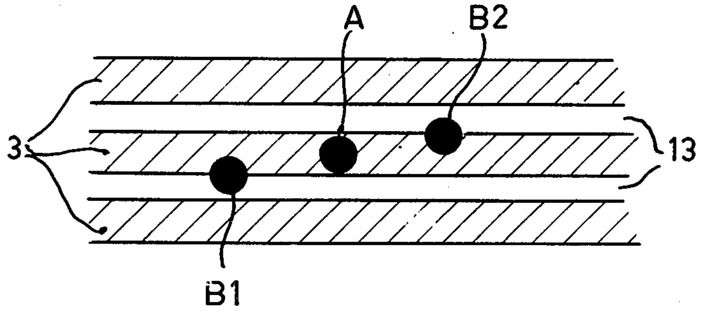
Figure 4:
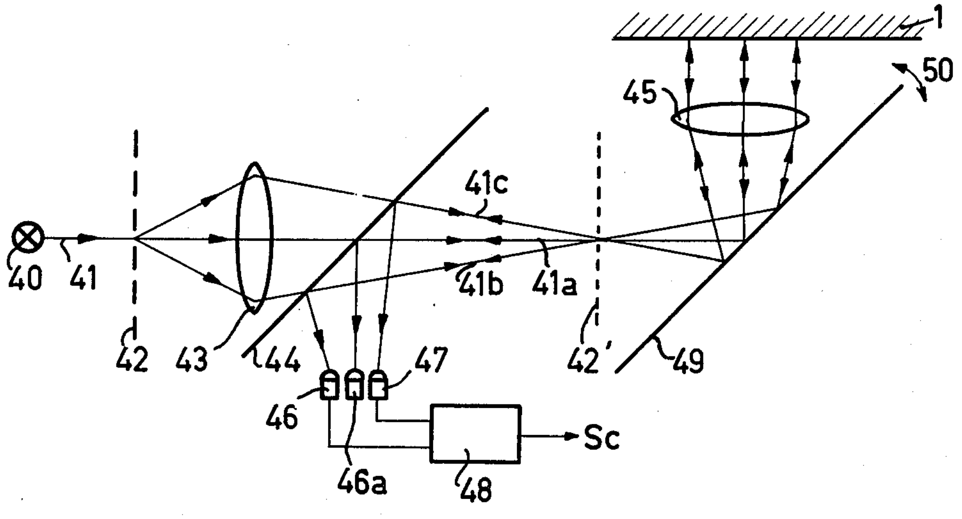
Figure 5:
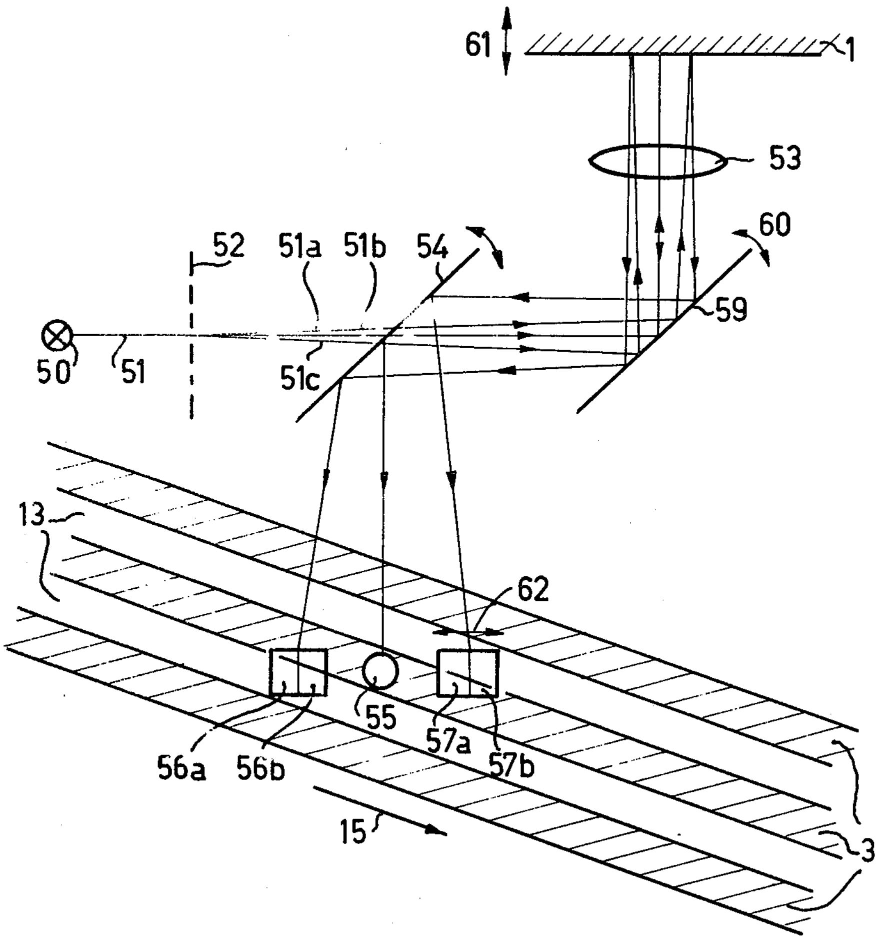

Embodiments of the invention will now be described by way of example, with reference to the accompanying diagrammatic drawings, in which:

FIG. 1 shows a previously proposed apparatus for reading a reflecting record carrier, FIG. 2 shows part of the optical structure of the record carrier to be read, FIG. 3 illustrates the principle of the invention, FIG. 4 shows a first embodiment of an apparatus according to the invention in which the position of the read beam relative to the track to be read is determined, and FIG. 5 shows a second embodiment of such an apparatus in which moreover the position of the plane of the track relative to the detection system is sensed.

Referring now to FIG. 1, there is shown a read apparatus in which a circular record carrier 1 shown in radial section is rotated by means of a spindle 4 which is driven by a motor, not shown, and passes through a center hole 2 in the record carrier. A beam of radiation 11 emitted by a source of radiation 5 passes through a half-silvered mirror 6 to be focuss by an objective lens 7 on the plane of tracks 3 recorded on the lower surface of the record carrier. The beam is modulated by a track and then is reflected to pass again through the lens 7, so that the modulated beam after reflection at the mirror 6 is focussed on a radiation-sensitive detector 8. The output of this detector is connected to a device 9 which comprises known electronic means for converting the output signal from the detector 8 into a video signal capable of being rendered visible and audible by a playback device 10.

FIG. 2 is a bottom plan view of part of the optical structure of the record carrier 1. An arrow 15 indicates the direction in which the record carrier is scanned. The structure comprises tracks 3 consisting of regions *b* alternating with areas *g*. The tracks are separated from one another by neutral intermediate strips 13. The tracks 3 may be recorded on the record carrier so as to be parallel to one another, i.e. concentric with one another. As an alternative the record carrier may be provided with a single continuous spiral track. The lengths of the blocks and areas represent the stored information. A beam of radiation which has been modulated by the track shows pulsatory variations in time in accordance with the sequence of blocks and areas in the track.

In an exemplary embodiment of an optical structure the mean period in the direction of length of the track is 4 $\mu m$ and the minimum length in the track is 2 $\mu m$. The width of a track is 4 $\mu m$.

To enable such a structure to be read care must be taken to ensure that the read beam forms an image only of a part of the record carrier of a size equal to about the smallest detail in the optical structure on the detector. It must be ensured that the axis of the read beam always intersects the plane of the track at the center of this track.

FIG. 3 illustrates the manner in which according to the invention the position of the read beam relative to the track can be detected. In addition to a spot of light A which is projected onto the center of a track 3, two light spots $B_1$ and $B_2$ are projected each on one edge of the track. The spot A is the sectional area of the read beam in the plane of the track. An image of this spot is formed on the high-frequency information detector. The spacing between the spots A and $B_1$ and that between the spots A and $B_2$ are equal and constant. Movement of A causes $B_1$ and $B_2$ to be moved in the same direction and through the same distance. When the spot A is located at the center of a track 3 the two detectors on which the spots $B_1$ and $B_2$ are imaged receive equal amounts of radiation. If the center of A does not coincide with the center of the track to be read, the intensities of the radiation beams incident on these detector are different. A comparison of the values of the electric output signals from the detectors provides a signal for determining the value and the direction of a deviation of the read beam from the track to be read.

FIG. 4 shows a manner in which the three light spots may be produced on the record carrier 1. A beam of radiation 41 emitted by a point source of radiation 40 impinges on a phase grating 42. This phase grating diffracts a beam of radiation into several diffraction orders. In the embodiment of FIG. 4 a zero-order beam **41*a* and two first order beams 41*b* and 41*c* emanate from the phase grating. Of each of these beams only one ray is shown. The lens 43 forms an image 42' of the phase grating 42 in the focal plane of the lens 45. Lens 45 is an objective lens that converges the three beams 41*a*, 41*b* and 41*c* to three spots onto the record carrier. These spots are situated at different positions, viewed in the direction of length of the track. In the embodiment of FIG. 4 the principal rays of the beams 41*a*, 41*b* and 41*c* are parallel. To ensure that two light spots are projected each on an edge of the track to be read, the grating lines when projected onto the plane of the track to be read must be at acute angles to the direction of the track. The beams reflected by the record carrier are reflected by a half-silvered mirror 44 to detectors 46*a*, 46 and 47. To avoid moire effects the radiation must be prevented from twice passing through the grating 42. Hence this grating is arranged at a location of the radiation path preceding the half-silvered mirror 44**.

The detector **46*a* is the high-frequency information detector, while detectors 46 and 47 are auxiliary detectors which play a part in determining the position of the read beam relative to the track to be read. The output signals from the detectors 46 and 47 are applied to an electronic device 48 in which a control signal $S_c$ is derived from these signals in known manner. This control signal enables the position of a tilting mirror 49** to be varied so that the light spot A is always projected onto the desired part of the record carrier.

The apparatus shown in FIG. 4 may simply be adapted to transmissive reading of a record carrier in which the information is recorded, for example, in the form of radiationabsorbing areas and radiation-transmitting blocks. This only requires a replacement of the half-silvered mirror 44 arranged in front of the record carrier and the 3 detectors **46*a*, 46 and 47** by an objective lens arranged behind the record carrier and three suitably oriented detectors.

In the arrangement shown in FIG. 4 the image 42' of the grating 42 is formed in the focal plane of objective lens 45. If, as shown in FIG. 5, this image is not in the focal plane of lens 45 the principal rays of the two outer beams emanating from the objective lens 45 no longer are perpendicular to the record carrier, but impinge at acute angles onto this record carrier. These outer beams can then be used also for detecting the position of the plane of the track part to be read. For this purpose the fact is utilized that the locations at which the first-order beams deflected by the grating impinge on the record carrier depend upon the position of this record carrier. To obtain a sufficiently high sensitivity the grating must be spaced from the objective lens 43 (FIG. 4) by a distance such that the first-order diffracted beams pass through the edge of the objective.

FIG. 5 illustrates the operation of such a device. 3 beams of radiation **51*a*, 51*b* and 51*c* are formed by means of a point source of radiation 50 and a grating 52. These beams are reflected via a mirror 59 to a record carrier 1 on which the beams 51*b* and 51*c* are incident at acute angles. The beams 51*a*, 51*b* and 51*c* are reflected by the record carrier 1 and by way of the mirror 59 and a half-silvered mirror 54 impinge on detectors 55, 57 and 56 respectively. Pivoting the mirror 59 permits of ensuring that the light spot A always is imaged on the desired part of the record carrier 1**.

The location of the plane of the track to be read in the read system can be detected by comparing the output signals from the component detectors **57*a* and 57*b* into which the detector 57 is divided. When the record carrier is moved in the direction indicated by an arrow 61 the beam 51*b* sweeps over the detector 57 in the direction indicated by an arrow 62. If the plane of the track is positioned at the correct location, the image of the spot formed by the beam 51*b* on the record carrier is reimaged symmetrically with respect to the component detectors 57*a* and 57*b***. These detectors then receive equal amounts of radiation and deliver equal output signals.

If the position of the read beam is correct, the sum of the radiations captured by detectors **56*a* and 56*b* is equal to the sum of radiations captured by detectors 57*a* and 57*b***.

To elucidate the orientation of the high-frequency information detector 55 and the auxiliary detectors 56 and 57 relative to the tracks the projection of part of the optical structure of the record carrier onto the detectors is shown. An arrow 15 indicates the direction in which the tracks move with respect to the detectors.

To prevent oscillations of any element in the path of the radiation from the radiation source to the optical read system from giving rise to a reading error, the auxiliary detector 56 also is divided in two component detectors, while the half-silvered mirror 54 is pivotable. Errors in the location and/or orientation of the radiation source relative to the read system may be compensated for by varying the position of the mirror 54 by means of a control signal obtained by comparing the signals supplied by the component detectors **56*a* and 56*b***.

When the output signals of the detectors **55, 56*a*, 56*b*, 57*a* and 57*b* are denoted by $S_{55}$, $S_{56a}$, $S_{56b}$, $S_{57a}$ and $S_{57b}$, respectively, then there is derived from $S_{55}$: the high-frequency video signal, from $(S_{56a} + S_{56b}) - (S_{57a} + S_{57b})$: a signal for controlling the position of the mirror 59,** from $S_{56a} - S_{56b}$ : a signal for controlling the position of the mirror 54, and from $S_{57a} - S_{57b}$ : a signal for controlling the lens 53, i.e. for focussing on the record carrier.

Obviously the apparatus according to the invention may also be used for reading record carriers other than disc-shaped ones, for example, tape-shaped record carriers, provided that at the location of the read system the part to be read of the optical structure of these carriers lies in a plane. The term "flat record carrier" used at the beginning of this Specification is to be understood to include such carriers.

What is claimed is:

1. Apparatus for reading a flat record carrier on which information, for example video and/or audio information, is recorded in at least one track which has an optical structure, which apparatus is of the type wherein a source of radiation and a radiation-sensitive detection system convert radiation emitted by the radiation source and modulated by the record carrier into electric signals, the improvement, wherein the source of radiation comprises means for emitting at least three beams of radiation and for producing at least three spots of radiation in the plane of the track part to be read, the dimensions of these spots corresponding to the smallest detail in the optical structure while their positions, viewed in the direction of width of the track, are different, two of the spots viewed in the direction of the width of the track being on opposite sides of a third of said spots, and in that for each beam of radiation at least one radiation-sensitive detector is provided.

2. Apparatus as claimed in claim 1, for reading a reflecting record carrier, characterized in that the principal ray of at least one of the radiation beams which, viewed in the direction of width of the track, occupy the outer positions, intersects the plane of the track part to be read at an acute angle.

3. Apparatus as claimed in claim 1, characterized in that the radiation source is constituted by a point source of radiation and a grating which is disposed at a location behind the radiation and serves to project diffraction images of the point source of radiation onto the plane of the track to be read, the grating lines projected onto this plane being at acute angles to the direction of the track.

* * * * *